United States Patent
Tago et al.

(10) Patent No.: US 10,891,429 B2
(45) Date of Patent: Jan. 12, 2021

(54) DEVICE AND METHOD FOR MANAGING TABLE

(71) Applicant: FUJITSU LIMITED, Kawasaki (JP)

(72) Inventors: Shinichiro Tago, Shinagawa (JP); Shuya Abe, Kawasaki (JP); Hiroaki Morikawa, Kawasaki (JP); Yutaka Mitsuishi, Kawasaki (JP); Nobuyuki Igata, Kawasaki (JP); Hodaka Yamamoto, Chiyoda (JP)

(73) Assignee: FUJITSU LIMITED, Kawasaki (JP)

(*) Notice: Subject to any disclaimer, the term of this patent is extended or adjusted under 35 U.S.C. 154(b) by 595 days.

(21) Appl. No.: 15/632,525

(22) Filed: Jun. 26, 2017

(65) Prior Publication Data

US 2018/0011831 A1  Jan. 11, 2018

(30) Foreign Application Priority Data

Jul. 5, 2016  (JP) ................ 2016-133001

(51) Int. Cl.
*G06F 40/174* (2020.01)
*G06F 16/95* (2019.01)
*G06F 9/451* (2018.01)
*G06F 16/248* (2019.01)
*G06F 8/38* (2018.01)
(Continued)

(52) U.S. Cl.
CPC .............. *G06F 40/174* (2020.01); *G06F 8/38* (2013.01); *G06F 9/451* (2018.02); *G06F 16/2282* (2019.01); *G06F 16/248* (2019.01); *G06F 16/95* (2019.01); *G06F 40/18* (2020.01)

(58) Field of Classification Search
CPC ........ G06F 17/243; G06F 9/451; G06F 16/95; G06F 16/2282; G06F 16/248; G06F 8/38; G06F 17/246
USPC .......................................... 707/812
See application file for complete search history.

(56) References Cited

U.S. PATENT DOCUMENTS

2008/0271047 A1  10/2008  Rafnsson
2012/0317134 A1*  12/2012  Bourbonnais ....... G06F 16/2365
                                                       707/769
(Continued)

FOREIGN PATENT DOCUMENTS

JP  2000-76296   3/2000
JP  2009-76032   4/2009
(Continued)

*Primary Examiner* — Alicia M Antoine
(74) *Attorney, Agent, or Firm* — Xsensus LLP

(57) ABSTRACT

A method includes receiving a designation of one or more first items that are to be included in a new table from a user, specifying, based on metadata related to second items included in each of a plurality of existing tables, an existing table from among the plurality of existing tables, the existing table including at least one of the designated one or more first items in the second items, specifying, based on other metadata related to an input item and an output item accompanied with execution of each of a plurality of programs, a program from among the plurality of programs, the program causing the designated one or more first items to be output as the output item when one of the second items included in the specified existing table is input as the input item, and outputting the specified existing table and the specified program.

14 Claims, 29 Drawing Sheets

| PROGRAM | META DATA |
|---|---|
| trans_siten | INPUT 1 : BRANCH CODE , OUTPUT : BRANCH NAME |
| sum_month | INPUT 1 : DATE , OUTPUT : MONTH<br>INPUT 1 : x & OUTPUT : x+ MONTHLY TOTAL |
| join_branch | INPUT 1 : BRANCH NAME , INPUT 2 : STORE NAME |

(51) Int. Cl.
*G06F 16/22* (2019.01)
*G06F 40/18* (2020.01)

(56) References Cited

U.S. PATENT DOCUMENTS

| | | | | |
|---|---|---|---|---|
| 2015/0039638 A1* | 2/2015 | Kamenz | ............... | G06F 16/93 |
| | | | | 707/758 |
| 2015/0051929 A1* | 2/2015 | Ranz | ............... | G06Q 10/00 |
| | | | | 705/7.11 |

FOREIGN PATENT DOCUMENTS

| | | |
|---|---|---|
| JP | 2010-527472 | 8/2010 |
| JP | 2010-237725 | 10/2010 |

* cited by examiner

FIG. 2A

| WAREHOUSE NAME | LOCATION (PREFECTURE) |
|---|---|
| X | TOKYO |
| Y | TOKYO |
| Z | SAITAMA |
| ⋮ | ⋮ |

FIG. 2B

| STORE NAME | LOCATION (PREFECTURE) |
|---|---|
| A BRANCH | TOKYO |
| B BRANCH | TOKYO |
| C BRANCH | SAITAMA |
| ⋮ | ⋮ |

FIG. 2C

| DAY | BRANCH NAME | SALES |
|---|---|---|
| 2015.1.1 | A BRANCH | 8293 |
| 2015.1.1 | B BRANCH | 9228 |
| 2015.1.1 | C BRANCH | 9482 |
| ⋮ | ⋮ | ⋮ |

FIG. 3

| TABLE | ITEM NAME |
|---|---|
| WAREHOUSE LOCATION | WAREHOUSE NAME , LOCATION (PREFECTURE) |
| STORE LOCATION | STORE NAME , LOCATION (PREFECTURE) |
| SALES | DATE , BRANCH NAME , SALES |

FIG. 4

| PROGRAM | META DATA |
|---|---|
| trans_siten | INPUT 1 : BRANCH CODE, OUTPUT : BRANCH NAME |
| sum_month | INPUT 1 : DATE, OUTPUT : MONTH<br>INPUT 1 : x & OUTPUT : x+ MONTHLY TOTAL |
| join_branch | INPUT 1 : BRANCH NAME , INPUT 2 : STORE NAME |

FIG. 6

| DATE | BRANCH NAME | LOCATION (PREFECTURE) | SALES |
|---|---|---|---|

FIG. 7

| PROGRAM | META DATA |
|---|---|
| trans_siten | INPUT 1 : BRANCH CODE , OUTPUT : BRANCH NAME |
| sum_month | INPUT 1 : DATE , OUTPUT : MONTH<br>INPUT 1 : x & OUTPUT : x+ MONTHLY TOTAL |
| join_branch | INPUT 1 : BRANCH NAME , INPUT 2 : STORE NAME |

FIG. 8

| TABLE | ITEM NAME |
|---|---|
| WAREHOUSE LOCATION | WAREHOUSE NAME , LOCATION (PREFECTURE) |
| STORE LOCATION | STORE NAME , LOCATION (PREFECTURE) |
| SALES | DATE , BRANCH NAME , SALES |

FIG. 9

| MONTH | TOTAL MONTHLY SALES |
|---|---|

FIG. 10

| PROGRAM | META DATA |
|---|---|
| join_branch | INPUT 1 : BRANCH NAME , INPUT 2 : STORE NAME |
| sum_month | INPUT 1 : DATE, OUTPUT : MONTH<br>INPUT 1 : x & OUTPUT : x+ MONTHLY TOTAL |

FIG. 11

DATE

SALES

FIG. 12

| TABLE | ITEM NAME |
|---|---|
| STORE LOCATION | STORE NAME , LOCATION (PREFECTURE) |
| SALES | DATE , BRANCH NAME , SALES |
| TELEPHONE NUMBER | STORE NAME , TELEPHONE , NUMBER |

FIG. 13

| DATE | BRANCH NAME | SALES |
|---|---|---|
| 2015.1.1 | A BRANCH | 8293 |
| 2015.1.1 | B BRANCH | 9228 |
| ⋮ | ⋮ | ⋮ |

FIG. 20A

| BRANCH SALES | DATE, COMPANY NAME, BRANCH NAME, SALES |

FIG. 20B

| PRODUCT SALES | DATE, PRODUCT NAME, SALES |

FIG. 20C

| BRANCH SALES | DATE, COMPANY NAME, BRANCH NAME, SALES |
| PRODUCT SALES | DATE, PRODUCT NAME, SALES |

FIG. 21

| sum_month | + | BRANCH SALES | DATE, COMPANY NAME, BRANCH NAME, SALES |

| sum_month | + | PRODUCT SALES | DATE, PRODUCT NAME, SALES |

FIG. 22

| MONTH | TOTAL MONTHLY SALES |
|---|---|
| 2015.1 | 290235 |
| 2015.2 | 283742 |
| ⋮ | ⋮ |

FIG. 24

| DATE | BRANCH NAME | LOCATION (PREFECTURE) | SALES |
|------|-------------|-----------------------|-------|

2301

| PROGRAM | META DATA |
|---------|-----------|
| sum_month | INPUT 1 : DATE, OUTPUT : MONTH<br>INPUT 1 : x & OUTPUT : x+ MONTHLY TOTAL |
| join_branch | INPUT 1 : BRANCH NAME , INPUT 2 : STORE NAME |
| join | INPUT 1 : x & INPUT 2 : x |
| ⋮ | ⋮ |

| | | | | 2301 |
|---|---|---|---|---|
| DATE | BRANCH NAME | LOCATION (PREFECTURE) | SALES | |

2551

| TABLE | ITEM NAME |
|---|---|
| STORE LOCATION | COMPANY NAME , STORE NAME ,(LOCATION (PREFECTURE)) |
| BRANCH SALES | (DATE), COMPANY NAME ,(BRANCH NAME),(SALES) |
| PRODUCT SALES | (DATE), PRODUCT NAME ,(SALES) |
| TELEPHONE NUMBER | COMPANY NAME , STORE NAME , TELEPHONE NUMBER |
| ⋮ | ⋮ |

FIG. 26A

| STORE LOCATION | COMPANY NAME , STORE NAME , LOCATION (PREFECTURE) |
|---|---|

FIG. 26B

| BRANCH SALES | DATE , COMPANY NAME , BRANCH NAME , SALES |
|---|---|

FIG. 26C

| PRODUCT SALES | DATE , PRODUCT NAME , SALES |
|---|---|

FIG. 26D

| STORE LOCATION | COMPANY NAME , STORE NAME , LOCATION (PREFECTURE) |
|---|---|
| BRANCH SALES | DATE , COMPANY NAME , BRANCH NAME , SALES |

FIG. 26E

| STORE LOCATION | COMPANY NAME , STORE NAME , LOCATION (PREFECTURE) |
|---|---|
| PRODUCT SALES | DATE , PRODUCT NAME , SALES |

FIG. 26F

| BRANCH SALES | DATE , COMPANY NAME , BRANCH NAME , SALES |
|---|---|
| PRODUCT SALES | DATE , PRODUCT NAME , SALES |

FIG. 26G

| STORE LOCATION | COMPANY NAME , STORE NAME , LOCATION (PREFECTURE) |
|---|---|
| BRANCH SALES | DATE , COMPANY NAME , BRANCH NAME , SALES |
| PRODUCT SALES | DATE , PRODUCT NAME , SALES |

FIG. 28

| DATE | BRANCH NAME | LOCATION (PREFECTURE) | SALES |
|---|---|---|---|
| 2015.1.1 | A BRANCH | TOKYO | 8293 |
| 2015.1.1 | B BRANCH | TOKYO | 9228 |
| 2015.1.1 | C BRANCH | KANAGAWA | 9482 |
| ⋮ | ⋮ | ⋮ | ⋮ |

DEVICE AND METHOD FOR MANAGING TABLE

CROSS-REFERENCE TO RELATED APPLICATION

This application is based upon and claims the benefit of priority of the prior Japanese Patent Application No. 2016-133001, filed on Jul. 5, 2016, the entire contents of which are incorporated herein by reference.

FIELD

The embodiment discussed herein is related to a table management technology.

BACKGROUND

In an information processing system of, for example, an organization or the like, a table in which data for activities of the organization, members of the organization, or the like is registered is prepared and the data is extracted as desired. For such data extraction, various technologies have been proposed in various documents.

For example, Japanese National Publication of International Patent Application No. 2010-527472, Japanese Laid-open Patent Publication No. 2000-76296, Japanese Laid-open Patent Publication No. 2010-237725, and Japanese Laid-open Patent Publication No. 2009-76032 discuss related art.

SUMMARY

According to an aspect of the invention, a method includes receiving a designation of one or more first items that are to be included in a new table from a user, specifying, based on metadata related to second items included in each of a plurality of existing tables, an existing table from among the plurality of existing tables, the existing table including at least one of the designated one or more first items in the second items, specifying, based on other metadata related to an input item and an output item accompanied with execution of each of a plurality of programs, a program from among the plurality of programs, the program causing the designated one or more first items to be output as the output item when one of the second items included in the specified existing table is input as the input item, outputting the specified existing table and the specified program, executing the specified program using information in the specified existing table to generate the new table including the designated one or more first items, and outputting the new table on a display.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 2A, 2B, and 2C are tables each illustrating an example of a table stored in a table storage unit;

FIG. 3 is a table illustrating an example of table metadata;

FIG. 4 is a table illustrating an example of program metadata;

FIG. 6 is a table illustrating examples of output items that are designated;

FIG. 7 is a table illustrating an example of program metadata;

FIG. 8 is a table illustrating an example of table metadata;

FIG. 9 is a table illustrating examples of output items that are designated;

FIG. 10 is a table illustrating an example of program metadata;

FIG. 11 is a table illustrating examples of input items that are generated;

FIG. 12 is a table illustrating an example of table metadata;

FIG. 13 is a table illustrating an example of a table;

FIGS. 20A, 20B, and 20C are tables each illustrating a specific operation of the information processing device;

FIG. 21 is a view illustrating a specific operation of the information processing device;

FIG. 22 is a view illustrating a specific operation of the information processing device;

FIG. 24 is a view illustrating a specific operation of the information processing device;

FIG. 25 is a view illustrating a specific operation of the information processing device;

FIGS. 26A, 26B, 26C, 26D, 26E, 26F, and 26G are tables each illustrating a specific operation of the information processing device;

FIG. 28 is a view illustrating a specific operation of the information processing device.

DESCRIPTION OF EMBODIMENT

There is a case where, when a plurality of tables in which data is registered has been prepared, in order to perform data analysis or the like, a user desires to generate another table including a designated item using some of the plurality of tables. However, even when several generation programs used for generating a table have been prepared in advance, it is difficult to select a generation program and an input table that is used for inputting the generation program, especially when the number of tables and generation programs is large.

In related art, there has not been any known solution for solving the above-described problem.

In one aspect, a technology disclosed herein provides a technology that is used for specifying an input table and a generation program that are used for generating an output table including a designated output item.

Figure 1:
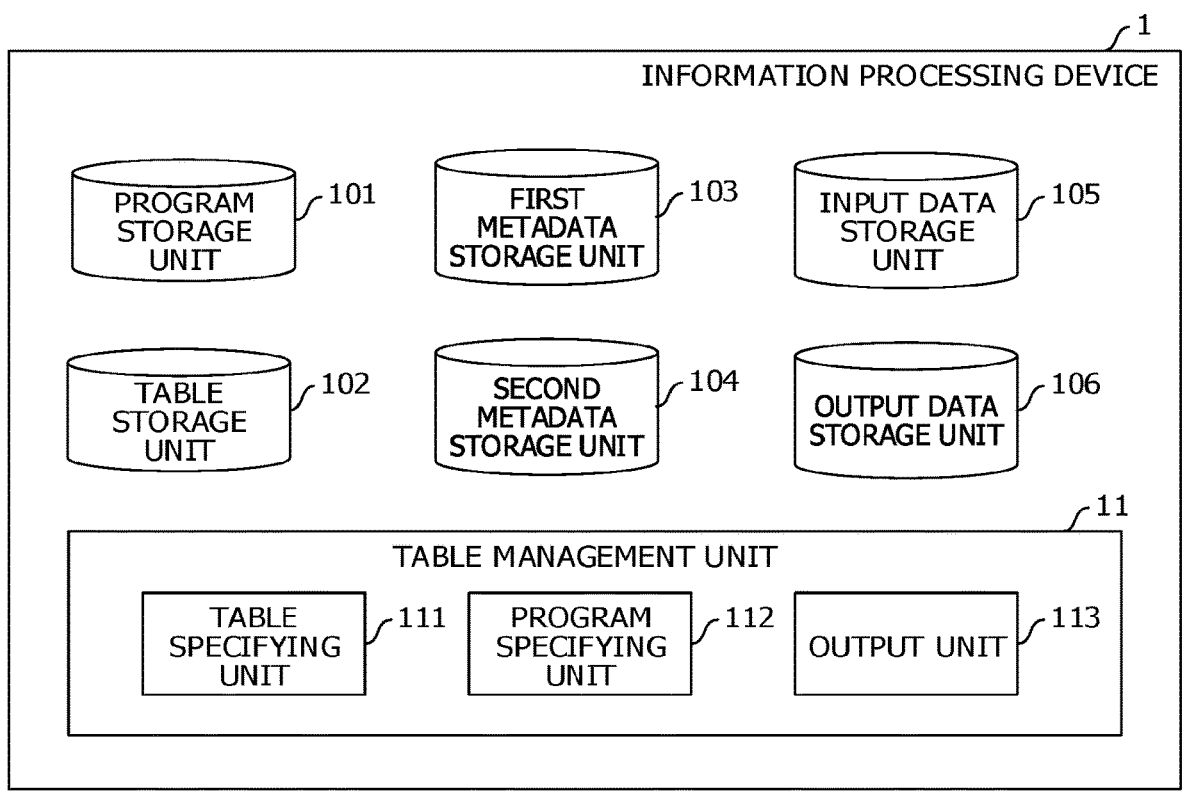
FIG. 1 is a functional block diagram of an information processing device.

FIG. 1 is a functional block diagram of an information processing device 1 according to an embodiment. The information processing device 1 includes a program storage unit 101, a table storage unit 102, a first metadata storage unit 103, a second metadata storage unit 104, an input data storage unit 105, an output data storage unit 106, and a table management unit 11. The table management unit 11 includes a table specifying unit 111, a program specifying unit 112, and an output unit 113.

The table specifying unit 111 executes processing, based on data stored in the input data storage unit 105, data stored in the first metadata storage unit 103, and data stored in the second metadata storage unit 104, and notifies the program specifying unit 112 of a processing result.

The program specifying unit 112 executes processing, based on the processing result received from the table specifying unit 111, the data stored in the input data storage unit 105, and the data stored in the second metadata storage unit 104, and notifies the output unit 113 of a processing result. The output unit 113 executes processing, based on the processing result received from the program specifying unit 112, data stored in the table storage unit 102, and data stored in the program storage unit 101, and stores a processing result in the output data storage unit 106.

FIGS. 2A, 2B, and 2C are tables each illustrating a table stored in the table storage unit 102. The table illustrated in FIG. 2A is a table including an item the item name of which is "WAREHOUSE NAME" and an item the item name of which is "LOCATION (PREFECTURE)". The table illustrated in FIG. 2B is a table including an item the item name of which is "STORE NAME" and the item the item name of which is "LOCATION (PREFECTURE)". The table illustrated in FIG. 2C is a table including an item the item name of which is "DATE", an item the item name of which is "BRANCH NAME", and an item the item name of which is "SALES".

FIG. 3 illustrates an example of table metadata stored in the first metadata storage unit 103. In the example of FIG. 3, the names of tables and the item names of items included in the table are stored. Data stored in the first metadata storage unit 103 is set by a user in advance or is automatically generated by the information processing device 1.

FIG. 4 illustrates an example of program metadata stored in the second metadata storage unit 104. In the example of FIG. 4, the names of programs, the item names of items each of which is input at the time of execution of the corresponding one of the programs, and the item names of items each of which is output by the execution of the corresponding one of the programs are stored. For example, in a program "trans_siten", an item the item name of which is "BRANCH CODE" is input from a table and the item the item name of which is "BRANCH NAME" is output. Data stored in the second metadata storage unit 104 is set by the user in advance or is automatically generated by the information processing device 1.

A program that is registered in the program metadata is stored in the program storage unit 101.

Next, with reference to FIG. 5 to FIG. 28, an operation of the information processing device 1 will be described.

Figure 5:
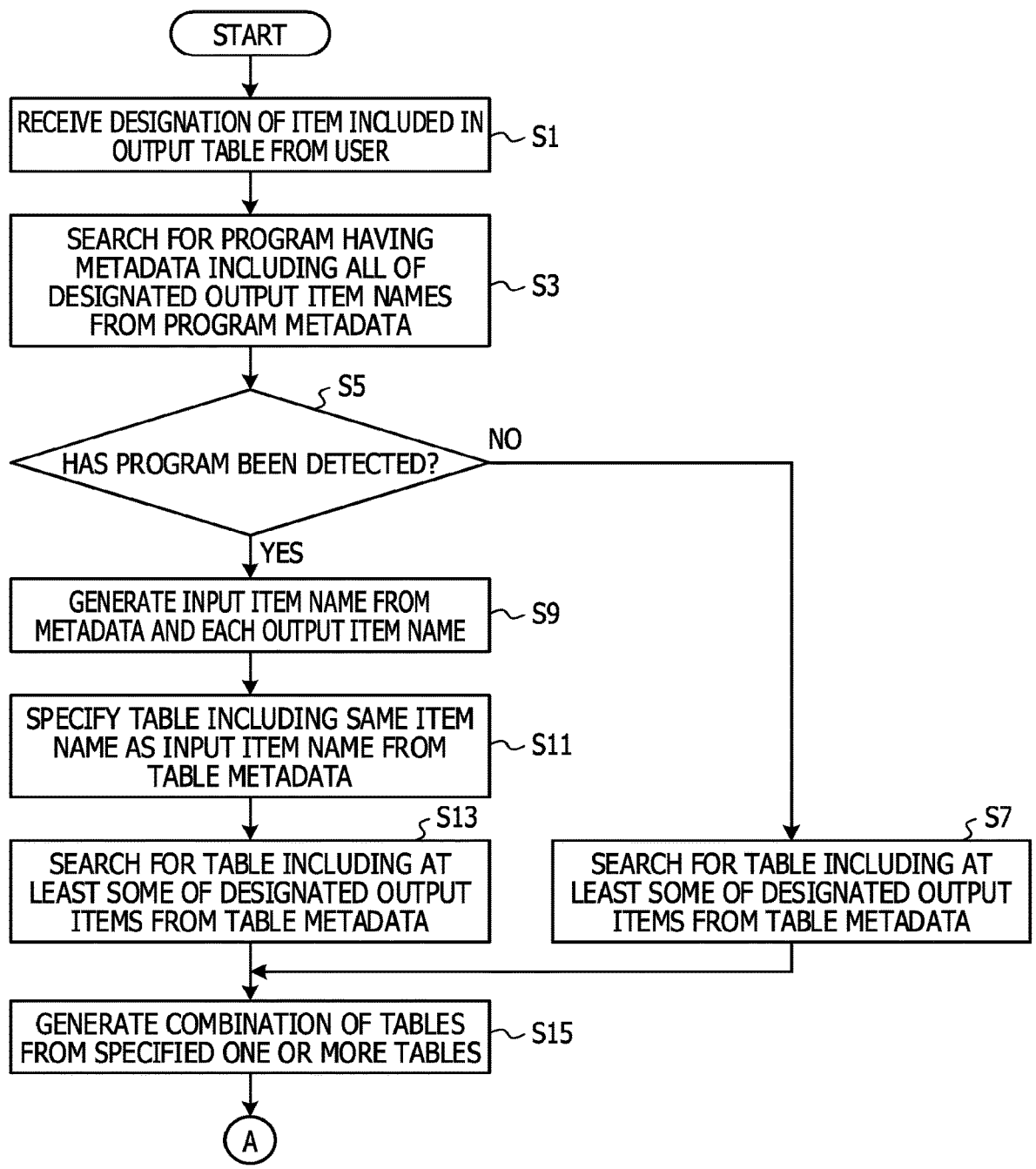
FIG. 5 is a flowchart illustrating a main processing flow.

First, the table specifying unit 111 of the information processing device 1 receives a designation of an output item included in an output table, which is desired by the user, from the user via an input device (for example, a mouse, a keyboard, or the like) of the information processing device 1 (Step S1 in FIG. 5). For example, as illustrated in FIG. 6, the table specifying unit 111 receives designations of an output item the item name of which is "DATE", an output item the item name of which is "BRANCH NAME", an output item the item name of which is "LOCATION (PREFECTURE)", and an output item the item name of which is "SALES". However, the number of items that are designated may be some other number other than 4.

The table specifying unit 111 searches for a program having metadata including all of the names of designated output items in the output table in the program metadata (Step S3).

The table specifying unit 111 determines whether or not the program has been detected by the processing of Step S3 (Step S5). If the program has not been detected by the processing of S3 (Step S5: NO route), the table specifying unit 111 searches for a table including at least some of the designated output items from the table metadata (Step S7). Then, the process proceeds to Step S15.

For example, assume that output items illustrated in FIG. 6 are designated and the program metadata is data illustrated in FIG. 4. In this case, as illustrated in FIG. 7, metadata including each of the designated output items does not exist. The metadata of the program "trans_siten" does not include other output items than the output item the item name of which is "BRANCH NAME". Each of pieces of metadata of a program "sum_month" and a program "join_branch" does not include any one of the output items. Note that x indicates an arbitrary character string.

Then, the processing of Step S7 is executed. For example, assume that table metadata is data illustrated in FIG. 3. In this case, as illustrated in FIG. 8, a table "WAREHOUSE LOCATION" including the item the item name of which is "LOCATION (PREFECTURE)", a table "STORE LOCATION" including the item the item name of which is "LOCATION (PREFECTURE)", a table "SALES" including the item the item name of which is "DATE", the item the item name of which is "BRANCH NAME", and the item the item name of which is "SALES" are specified.

Returning to the description of FIG. 5, if the program has been detected by the processing of Step S3 (Step S5: YES Route), the table specifying unit 111 generates the item name of an input item from the metadata of the detected program and each of the item names of the designated output items (Step S9).

Figure 9:
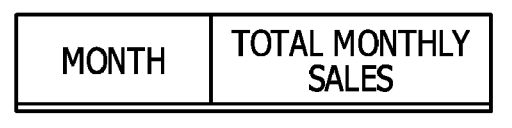

For example, assume that the output items illustrated in FIG. 9 are designated and the program metadata is data illustrated in FIG. 10. In this case, each of the designated output items is output by execution of the program "sum_month".

Then, the metadata of the program "sum_month" is used, and thereby, an input item the item name of which is "DATE" and an input item the item name of which is "SALES" are generated, as illustrated in FIG. 11.

Returning to the description of FIG. 5, the table specifying unit 111 specifies a table including an item the item name of which is the same as the item name of at least one of the input items from the table metadata (Step S11). For example, when the table metadata is data illustrated in FIG. 12, a table "SALES" is specified. A table that is specified is, for example, a table illustrated in FIG. 13.

The table specifying unit 111 searches for a table including at least some of the designated output items from the table metadata (Step S13). This step is the same as Step S7.

The table specifying unit 111 generates, from one or more tables specified in Step S7 or one or more tables specified in Step S11 or S13, a combination of tables (Step S15). The number of tables included in the combination may be 1. For example, when a table a and a table b are specified, the table a, the table b, and the table a and the table b are generated as a combination. Then, the table specifying unit 111 outputs the generated combination of tables to the program specifying unit 112. Then, the process proceeds to Step S17 of FIG. 14 via a terminal A.

Figure 14:
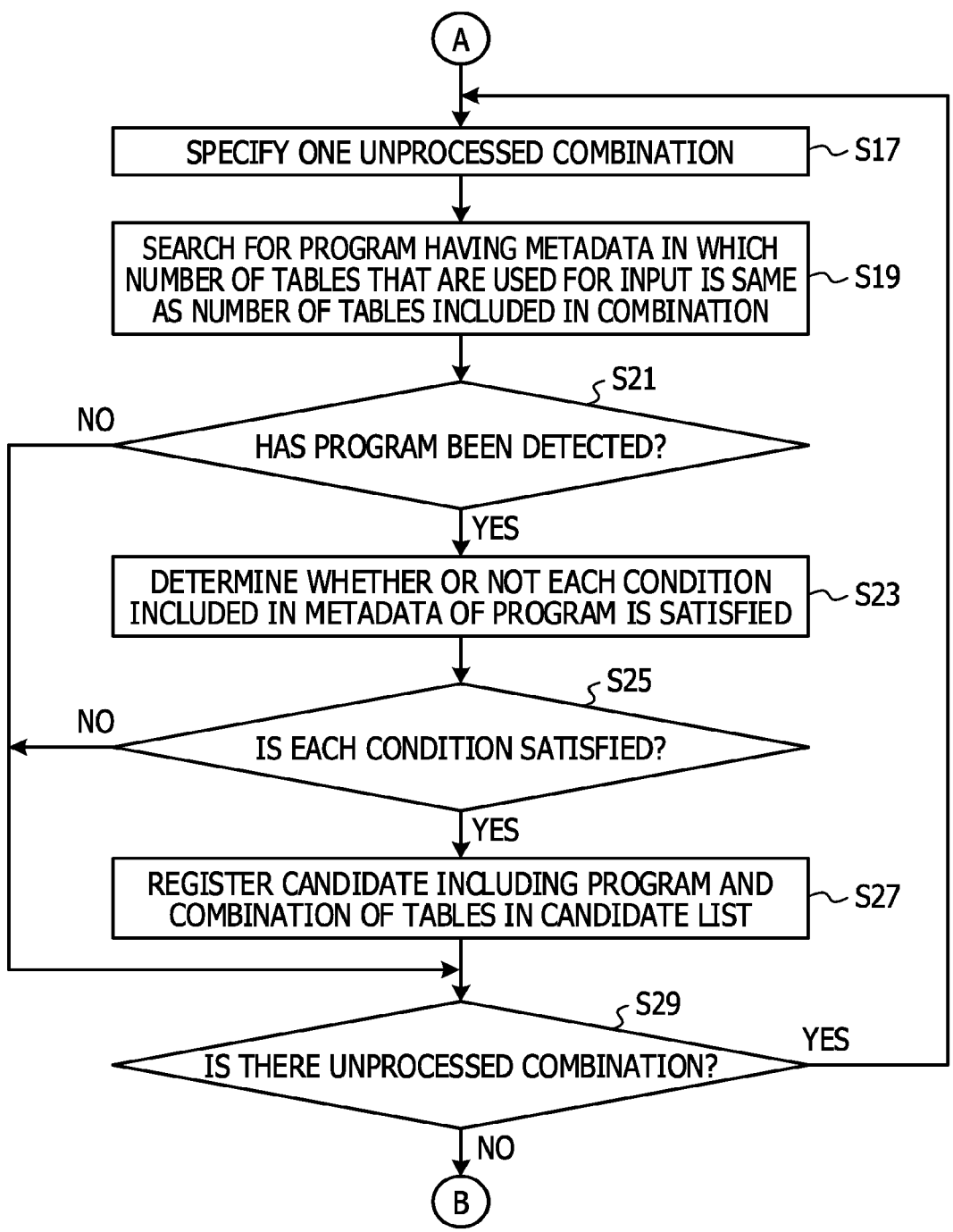
FIG. 14 is a flowchart illustrating a main processing flow.

Moving to the description of FIG. 14, the program specifying unit 112 specifies one unprocessed combination among the generated combinations (Step S17 in FIG. 14).

The program specifying unit 112 searches for, from the program metadata, a program having the metadata in which the number of tables used for input is the same as the number of tables included in the combination specified in Step S17 (Step S19). For example, when the number of tables included in the combination is "2" and the program metadata is data illustrated in FIG. 4, the program "join_branch" is detected.

The program specifying unit 112 determines whether or not the program has been detected by the processing of Step S19 (Step S21). If the program has not been detected by the processing of Step S19 (Step S21: NO route), the process proceeds to Step S29.

On the other hand, if the program has been detected by the processing of Step S19 (Step S21: YES route), the program specifying unit 112 determines whether or not each condition included in the metadata of the detected program is satisfied (Step S23). For example, if the program "trans_siten" illustrated in FIG. 4 has been detected, the metadata includes a condition "INPUT 1: BRANCH CODE" and a condition "OUTPUT: BRANCH NAME".

If at least one of the conditions of the detected program is not satisfied (Step S25: NO route), the process proceeds to Step S29. On the other hand, if each of the conditions of the detected program is satisfied (Step S25: YES route), a candidate including the detected program and the combination specified in Step S17 is registered in a candidate list (Step S27).

The program specifying unit 112 determines whether or not there is an unprocessed combination among the generated combinations (Step S29). If there is an unprocessed combination (Step S29: YES route), the process returns to Step S17. On the other hand, if there is not an unprocessed combination (Step S29: NO route), the process proceeds Step S31 of FIG. 15 via a terminal B.

Figure 15:
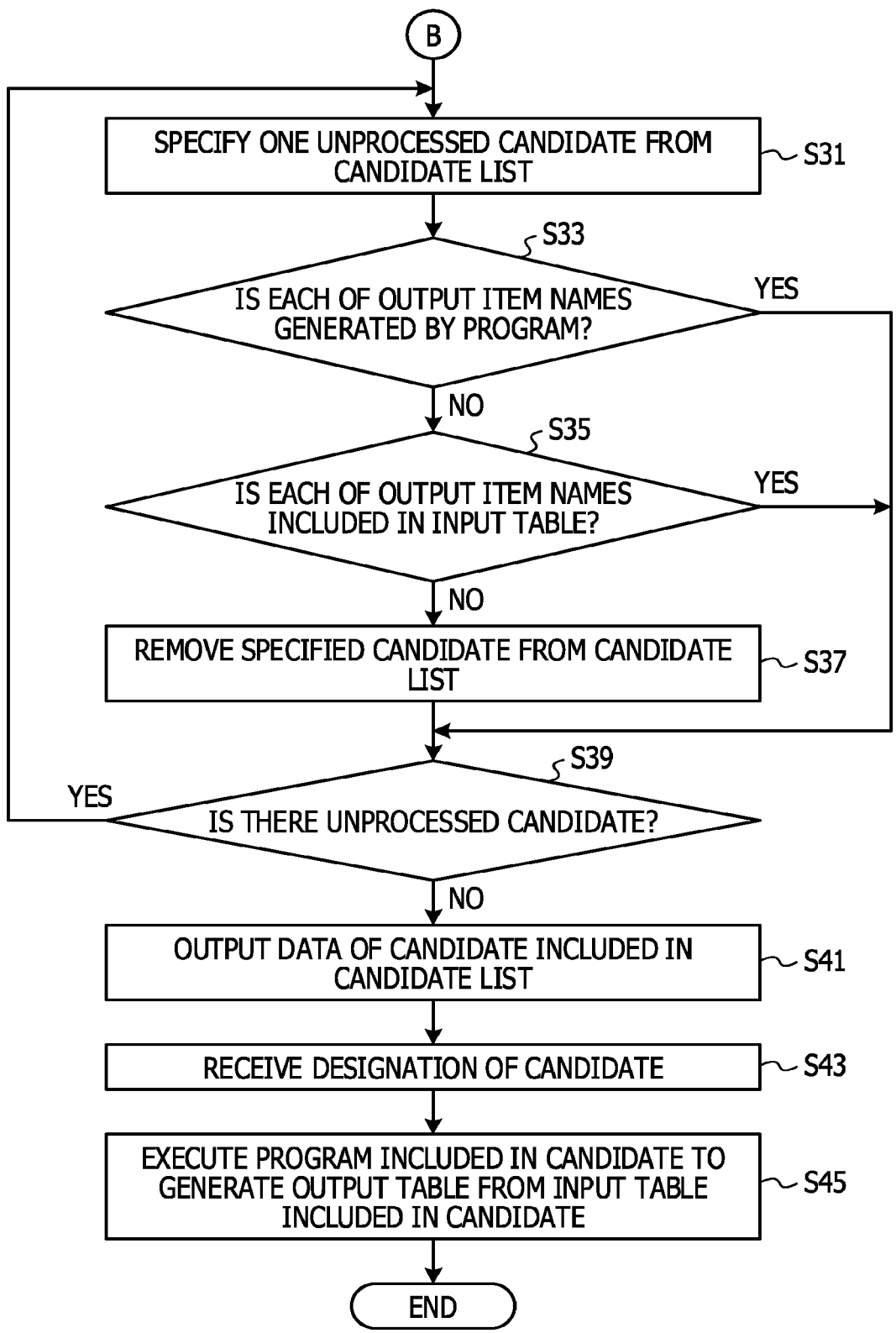
FIG. 15 is a flowchart illustrating a main processing flow.

Moving to the description of FIG. 15, the program specifying unit 112 specifies one unprocessed candidate from the candidate list (Step S31 in FIG. 15).

The program specifying unit 112 determines whether or not each of the output items designated in Step S1 is generated by execution of a program included in the candidate (Step S33). If each of the designated output items is generated by the execution of the program included in the candidate specified in Step S31 (Step S33: YES route), the process proceeds to Step S39.

On the other hand, each of the designated output items is not generated by the execution of the program included in the candidate specified in Step S31 (Step S33: NO route), the program specifying unit 112 determines whether or not each of the designated output items is included in one of input tables included in the candidate (Step S35). If, even when each of the output items is not generated by the execution of the program, each of the output items is included in one of the input tables, each of the output items is output by the execution of the program, and thus, the processing of Step S35 is executed.

If each of the designated output items is included in one of the input tables included in the candidate (Step S35: YES route), the process proceeds to Step S39.

On the other hand, if at least one of the designated output items is not included in one of the input tables included in the candidate (Step S35: NO route), the program specifying unit 112 removes the candidate specified in Step S31 from the candidate list (Step S37).

The program specifying unit 112 determines whether or not there is an unprocessed candidate in the candidate list (Step S39). If there is an unprocessed candidate in the candidate list (Step S39: YES route), the process returns to Step S31.

On the other hand, if there is not an unprocessed candidate in the candidate list (Step S39: NO route), the program specifying unit 112 outputs the candidate list to the output unit 113. Accordingly, the output unit 113 outputs data of the candidate included in the candidate list to a display device (for example, a monitor or a printer) (Step S41).

The user refers to the data of the candidate output to the display device and selects one proper candidate by an operation of the input device (for example, a mouse or a keyboard). Accordingly, the output unit 113 receives a designation of the candidate (Step S43).

The output unit 113 reads out the program included in the candidate from the program storage unit 101 and reads out a table included in the candidate from the table storage unit 102. Then, the output unit 113 executes the readout program and thereby generates an output table including each of the designated output items from the readout table (Step S45). The output unit 113 stores the generated output table in the output data storage unit 106. Then, the process ends.

As has been described, according to this embodiment, when the user designates output items, an output table including each of the designated output items is automatically generated.

With reference to FIG. 16 to FIG. 28, an operation of the information processing device 1 will be more specifically described below.

Figure 16:
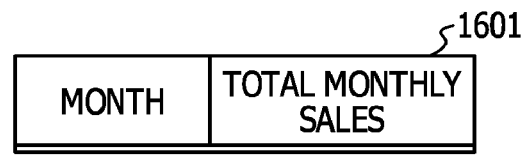
FIG. 16 is a table illustrating a specific operation of the information processing device.
Figure 17:
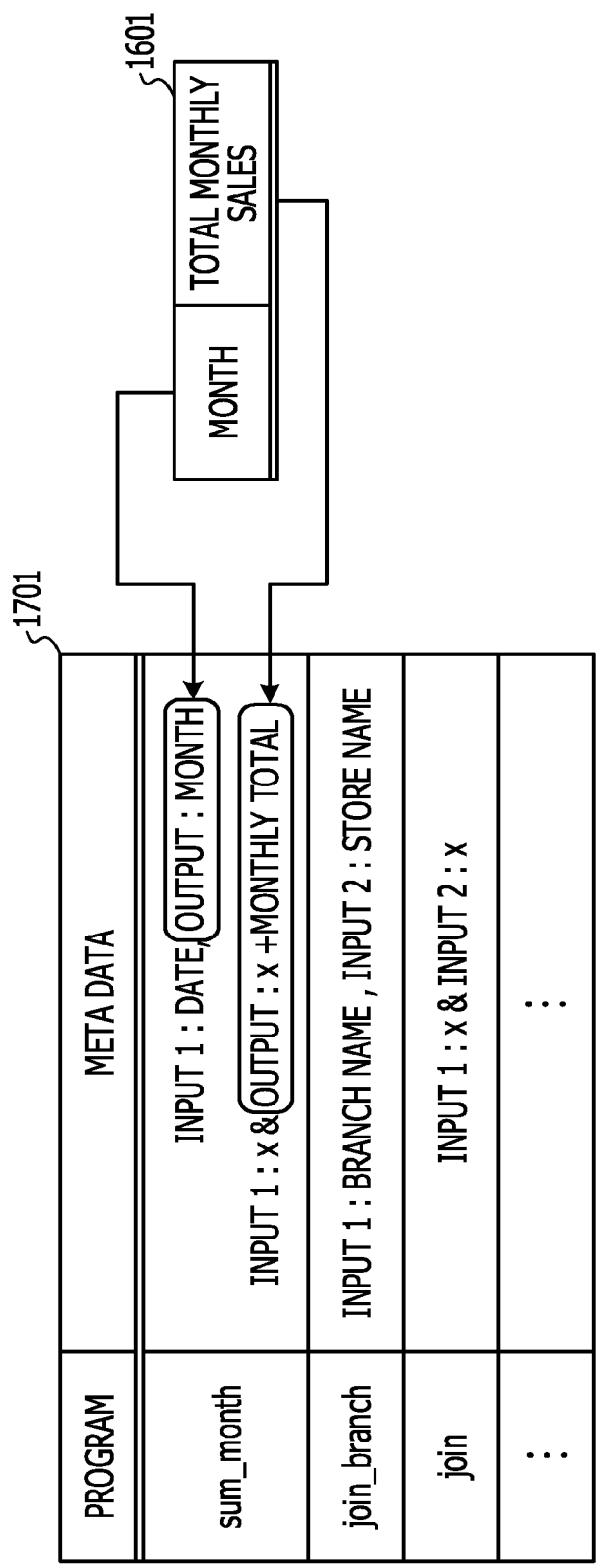
FIG. 17 is a table illustrating a specific operation of the information processing device.
Figure 18:
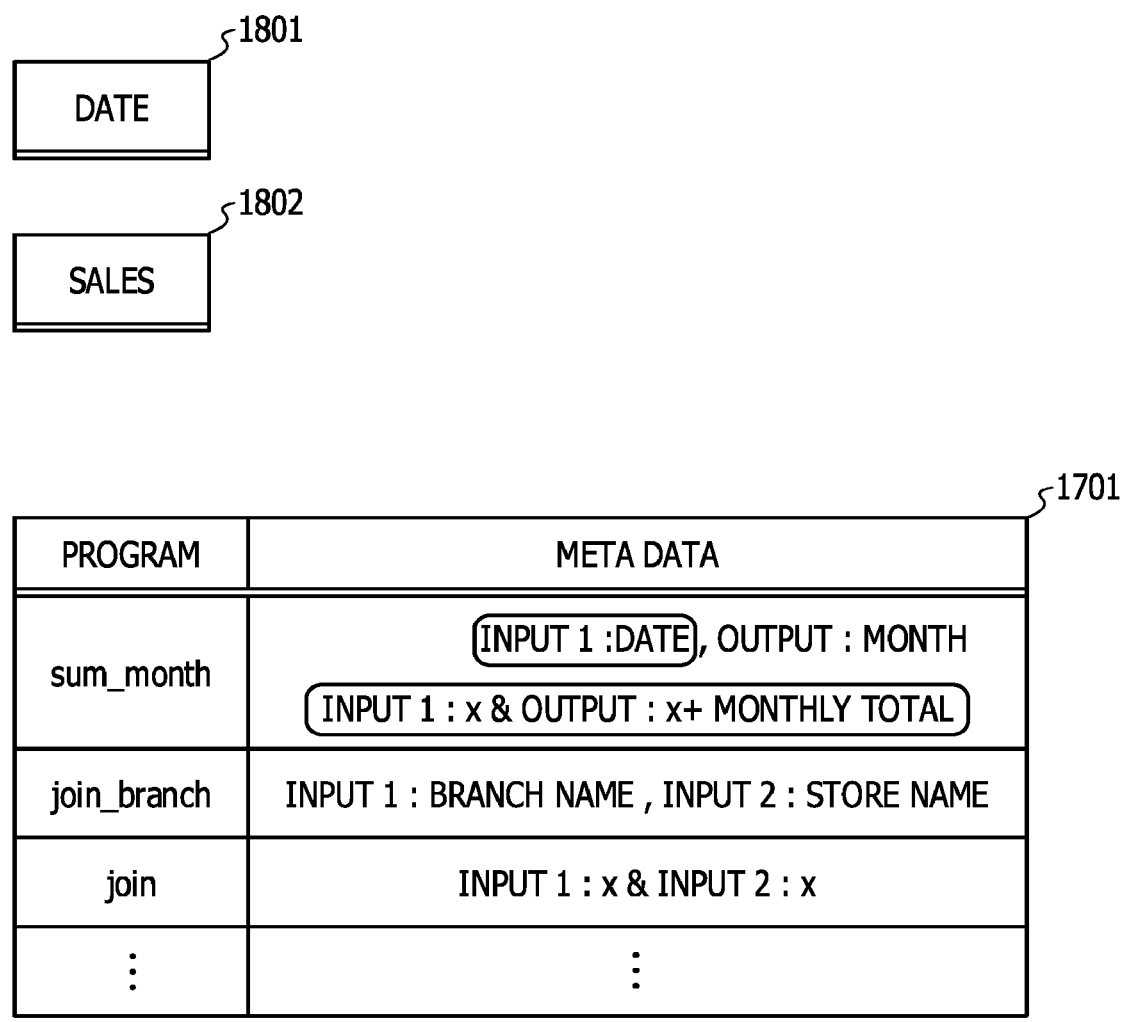
FIG. 18 is a view of tables illustrating a specific operation of the information processing device.
Figure 19:
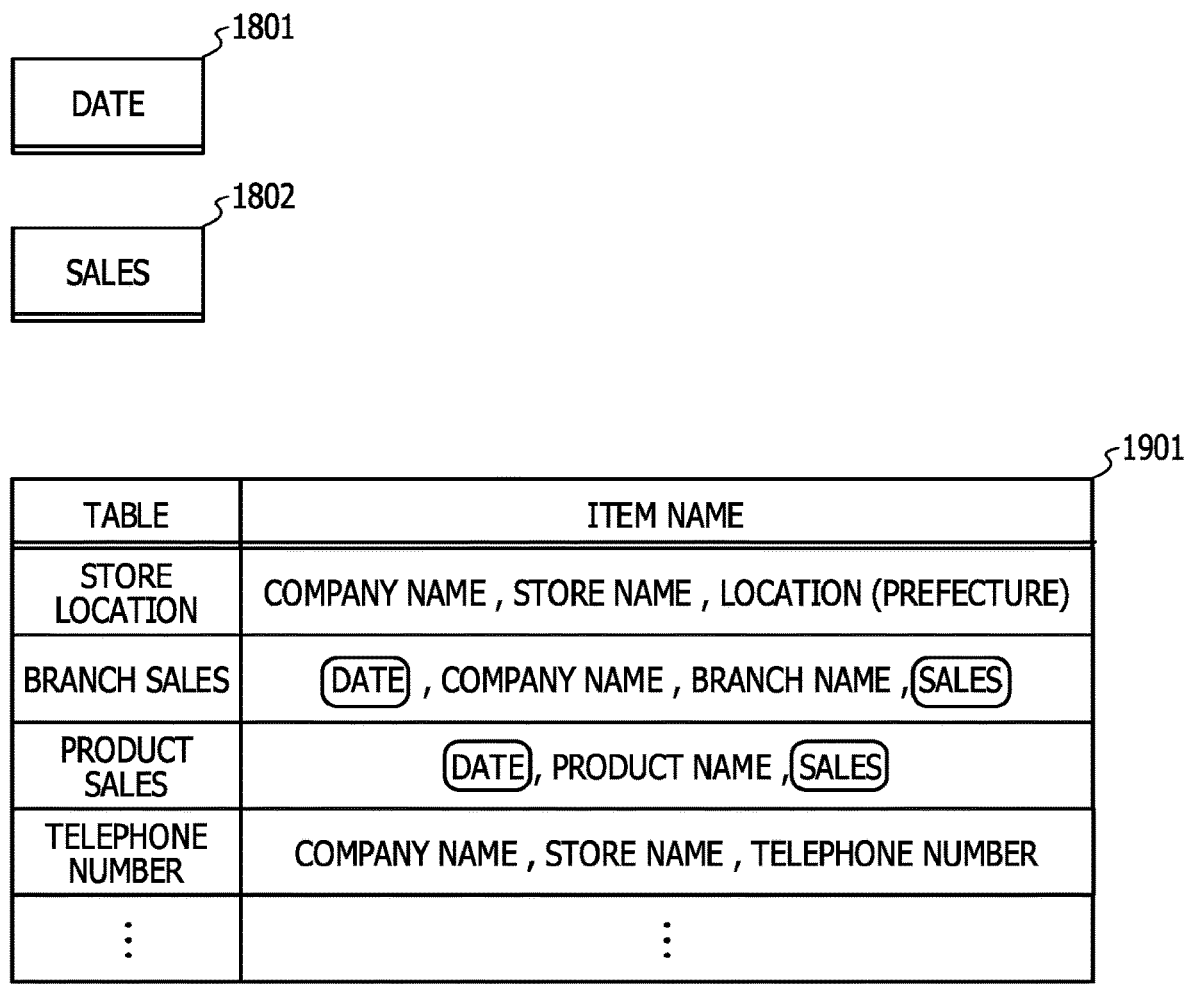
FIG. 19 is a view of tables illustrating a specific operation of the information processing device.

First, a first example will be described. For example, as illustrated in FIG. 16, assume that an output item the item name of which is "MONTH" and an output item the item name of which is "TOTAL MONTHLY SALES" have been designated. In this case, as illustrated in FIG. 17, the program "sum_month" that causes an item the item name of which is "MONTH" and an item the item name of which is "x+MONTHLY TOTAL (x is an arbitrary character string)" to be output is specified from program metadata 1701. Then, as illustrated in FIG. 18, based on conditions included in the metadata of the program "sum_month", an input item 1801 the item name of which is "DATE" and an input item 1802 the item name of which is "SALES" are generated. As illustrated in FIG. 19, a table including one of the input item 1801 and the input item 1802 is specified from table metadata 1901. In this case, a table "BRANCH SALES" and a table "PRODUCT SALES" are specified, and therefore, combinations illustrated in FIG. 20A to FIG. 20C are generated.

When the program metadata 1701 is compared to FIG. 20A, for the program "sum_month", the number of tables that are used for input is 1, each of conditions registered in the program metadata 1701 is satisfied, and also, each data of output item 1601 is output. Accordingly, a candidate including the table of FIG. 20A and the program "sum_month" is registered in the candidate list.

When the program metadata 1701 is compared to FIG. 20B, for the program "sum_month", the number of tables that are used for input is 1, each of conditions registered in the program metadata 1701 is satisfied, and also, each data of the output item 1601 is output. Accordingly, a candidate including the table of FIG. 20B and the program "sum_month" is registered in the candidate list.

Other candidates are not registered in the candidate list.

Therefore, as illustrated in FIG. 21, data of each candidate is output to the display device. For example, when a candidate including the program "sum_month" and the table "PRODUCT SALES" is selected and the program "sum_month" is executed, the table "PRODUCT SALES" is received as an input and a table illustrated in FIG. 22 is output.

Figure 23:
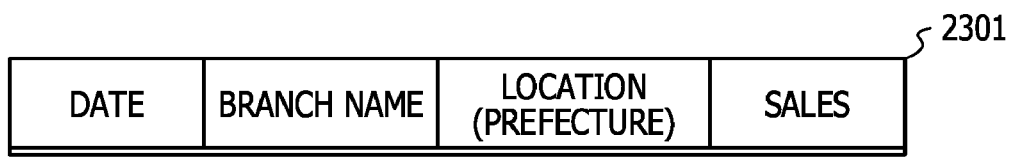
FIG. 23 is a view illustrating a specific operation of the information processing device.

Next, a second example is illustrated. For example, as illustrated in FIG. 23, assume that the output item the item name of which is "DATE", the output item the item name of which is "BRANCH NAME", the output item the item name of which is "LOCATION (PREFECTURE)", and the output item the item name of which is "SALES" are specified. In this case, as illustrated in FIG. 24, a program that causes each data of the designated output item 2301 to be output is not specified from program metadata 2401. Then, as illustrated in FIG. 25, a table including one of the item the item name of which is "DATE", the item the item name of which is "BRANCH NAME", the item the item name of which is "LOCATION (PREFECTURE)", and the item the item name of which is "SALES" is specified from table metadata 2551. In this case, the table "STORE LOCATION", the table "BRANCH SALES", and the table "PRODUCT SALES" are specified, and therefore, combinations illustrated in FIGS. 26A, 26B, 26C, 26D, 26E, 26F, and 26G are generated.

When the program metadata 2401 is compared to FIG. 26D, for the program "join_branch", the number of tables that are used for input is 2, each of conditions registered in the program metadata 2401 is satisfied, and also, each data of the designated output item is included in some part of the table of FIG. 26D. Accordingly, a candidate including the table of FIG. 26D and the program "join_branch" is registered in the candidate list.

When the program metadata 2401 is compared to FIG. 26D, for a program "join", the number of tables that are used for input is 2, each of conditions registered in the program metadata 2401 is satisfied, and each data of the designated output item is included in some part of the table of FIG. 26D. Accordingly, a candidate including the table of FIG. 26D and the program "join" is registered in the candidate list.

Other candidates are not registered in the candidate list.

Figure 27:
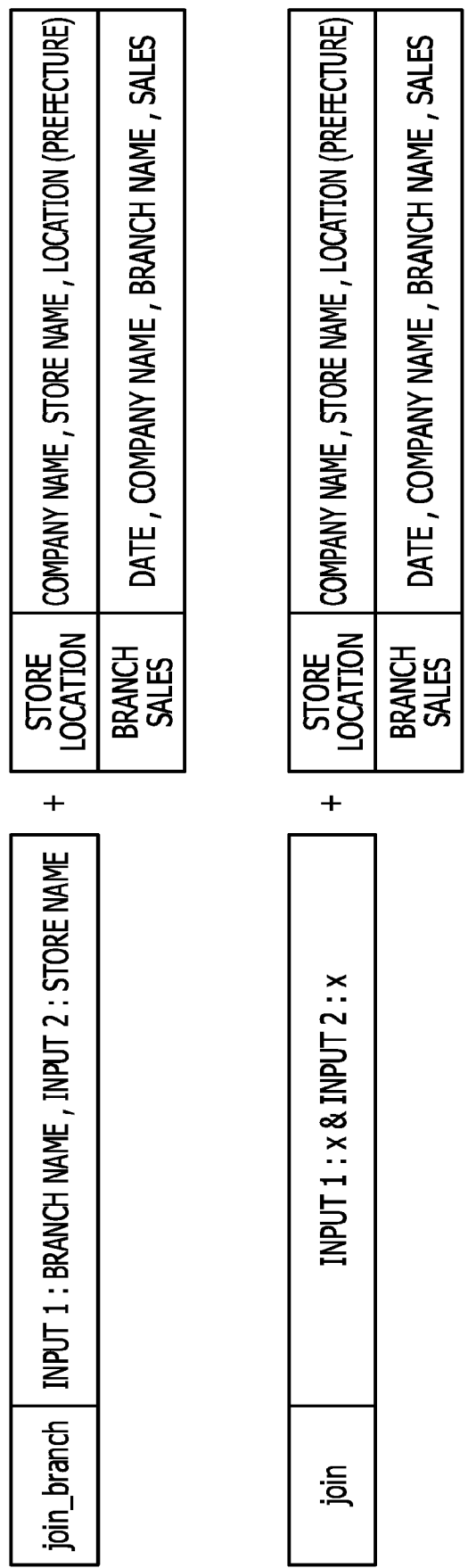
FIG. 27 is a view illustrating a specific operation of the information processing device.

Accordingly, as illustrated in FIG. 27, data of each candidate is output to the display device. For example, when a candidate including the program "join_branch", the table "STORE LOCATION", and the table "BRANCH SALES" is selected and the program "join_branch" is executed, the table "STORE LOCATION" and the table "BRANCH SALES" are received as inputs and a table illustrated in FIG. 28 is output.

An embodiment has been described above, but the present disclosure is not limited thereto. For example, there may be a case where the above-described functional block configuration of the information processing device 1 does not match an actual program module configuration.

Also, the configuration of each table, which has been described above, is merely an example and there may be a case where each table does not have the above-described configuration. Furthermore, in a processing flow, the order of process steps may be changed as long as a processing result is not changed. Moreover, each of the process steps may be executed in parallel with another one of the process steps.

Figure 29:
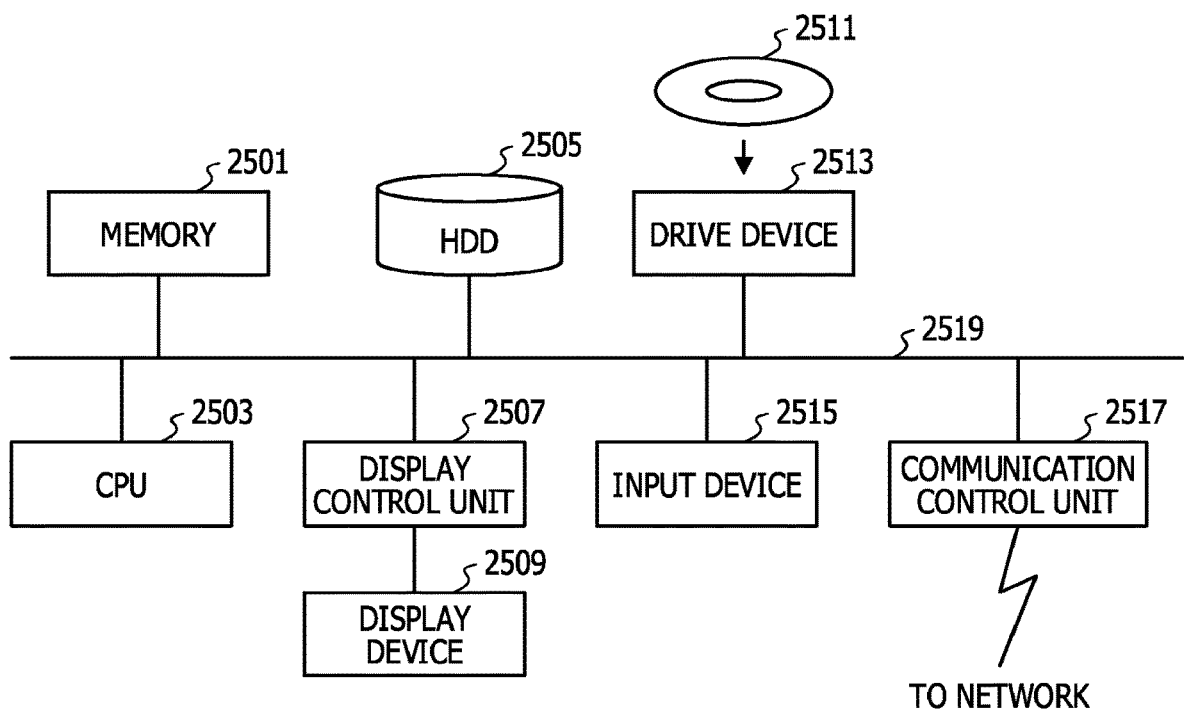
FIG. 29 is a hardware configuration diagram illustrating a computer.

Note that the above-described information processing device 1 is a computer device and, as illustrated in FIG. 29, memory 2501, a central processing unit (CPU) 2503, a hard disk drive (HDD) 2505, a display control unit 2507 coupled to a display device 2509, a drive device 2513 used for a removable disk 2511, an input device 2515, and a communication control unit 2517 used for providing a connection to a network are coupled to one another via a bus 2519 therein. When being executed by the CPU 2503, an application program that causes an operating system (OS) and the processing in this embodiment to be performed is stored in the HDD 2505 and is read out from the HDD 2505 to the memory 2501. The CPU 2503 controls the display control unit 2507, the communication control unit 2517, and the drive device 2513 in accordance with processing contents of the application program to cause each of the display control unit 2507, the communication control unit 2517, and the drive device 2513 to perform a predetermined operation. Also, data that is being processed is mainly stored in the memory 2501 but may be stored in the HDD 2505. In this embodiment, the application program that causes the above-described processing to be performed is stored in the computer-readable removable disk 2511 to be distributed and is installed in the HDD 2505 from the drive device 2513. There is also a case where the application program is installed in the HDD 2505 via a network, such as the Internet or the like, and the communication control unit 2517. In the computer device, hardware, such as the CPU 2503, the memory 2501, or the like, the OS, and a program, such as the application program, which have been described above, organically cooperate with one another to realize various functions, such as the above-described functions. For example, the above-described application program is executed by the CPU 2503, and thereby, the table specifying unit 111, the program specifying unit 112, and the output unit 113 are realized. Also, for example, the program storage unit 101, the table storage unit 102, the first metadata storage unit 103, the second metadata storage unit 104, the input data storage unit 105, and the output data storage unit 106 are provided in the memory 2501 or the HDD 2505.

The embodiment described above may be summarized as follows.

A table management method according to a first aspect of this embodiment includes (A) specifying one or more tables each of which includes at least one of one or more items (for example, one or more output items) designated by a user from a first data storage unit (for example, the first metadata storage unit 103) that stores, for each table, information for items of the tables, (B) specifying, when at least one of the items is input from each of the specified one or more tables, a program that causes each of the one or more items to be output from a second data storage unit (for example, the second metadata storage unit 104) that stores information for an item that is input at the time of execution of the program and an item that is output by the execution of the program for each program, and (C) outputting information for the one or more tables and information for the specified program.

As described above, a target is limited to one or more tables each of which includes at least one of designated one or more items and thus processing is executed. Thus, processing time is reduced and also an input table and a generation program that are used for generating an output table including the designated one or more items may be specified.

Also, a configuration in which the specified program satisfies a first condition that each of one or more items matches one of the items that are output by the execution of the program or a second condition that each of the one or more items matches one of the items of the one or more tables may be employed. Thus, a program in which output is not proper may be excluded.

Also, a configuration in which the specified program satisfies a third condition that the number of the one or more tables and the number of tables that are used for inputting the program match one another may be employed. Thus, a program in which the number of inputs is not proper may be excluded.

Also, a configuration in which the specified program satisfies a fourth condition that each item that is input at the time of execution of the program matches one of the items of the one or more tables and each item that is output by the execution of the program matches one of the one or more items may be employed. A program in which input or output is not proper may be excluded.

Also, the table management method may further include (D) specifying a program that causes each of the one or more items to be output from the second data storage unit, and (E) generating one or more input items from information for input and output of the specified program and each of the one or more items. Then, the fourth condition may be a condition that each item that is input at the time of execution of the program matches one of the items of the one or more tables or one of the one or more input items, and each item that is output by the execution of the program matches one of the one or more items. The one or more input items generated in the above-described manner are also used, and thereby, a more proper program may be specified.

Also, the table management method may further include (F) executing the specified program using the items of the one or more tables as inputs to generate an output table including each of the one or more items. Thus, an output table that is desired by the user may be generated.

A table device according to a second aspect of this embodiment includes (G) a first specifying unit (for example, the table specifying unit 111) configured to specify one or more tables each of which includes at least one of one or more items designated by a user from a first data storage unit that stores, for each table, information for items of the tables, (H) a second specifying unit (for example, the program specifying unit 112) configured to specify a program that causes, when at least one of items is input from each of the one or more tables specified by the first specifying unit, each of the one or more items to be output from a second data storage unit that stores an item that is input at the time of execution of a program and information for an item that is output by the execution of the program for each program, and (I) an output unit (for example, the output unit 113) configured to output information for the one or more tables and information for the specified program.

Note that a program that causes a computer to execute a process according to the above-described method may be created and the program may be stored in a computer-readable storage medium or a storage device, such as, for example, a flexible disk, a CD-ROM, a magneto-optical disk, semiconductor memory, a hard disk, or the like. Note that an intermediate processing result is temporarily stored in a storage device, such as main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method executed by a computer, the method comprising:

specifying one or more tables, each of the one or more tables including one or more output items designated by a user, based on first correspondence information associating items with each table;

specifying, for a first combination of the specified one or more tables, a program that satisfies a condition indicating that each item inputted at an execution of the program corresponds to one of the items in the table of the first combination and each item output by the execution corresponds to the one or more output items, from among second correspondence information including an input item that is input to the program and an output item that is output by the execution of the program;

determining, for a second combination consisting of the program and the first combination, whether the one or more output items satisfy a condition indicating that the one or more output items corresponds to items output by the execution of the program; and outputting, from the second combination, output information that satisfies the condition indicating that the one or more output items corresponds to items output by the execution of the program, wherein the output information includes the one or more tables and the program.

2. The method according to claim 1, wherein the program satisfies a first condition or a second condition, the first condition indicates that each item inputted at the execution of the program matches the output item, and the second condition indicates that each item inputted at the execution of the program matches one of the items in the specified one or more tables.

3. The method according to claim 1, wherein the program satisfies a third condition that a first number of the specified one or more tables and a second number of tables that are used for inputting the program match one another.

4. The method according to claim 1, wherein the program satisfies a fourth condition that the input item matches one of the items in the specified one or more tables and the output item matches at least one item inputted at the execution of the program.

5. The method according to claim 4, further comprising:

specifying the program that causes each item inputted at the execution of the program to be output based on the second correspondence information; and generating one or more input items based on each item inputted at the execution of the program, and information for input and output of the specified program.

6. The method according to claim 3, wherein the fourth condition is a condition that the input item matches one of the items in the specified one or more tables or one of the input items inputted at the execution of the program and the output item matches one of the designated at least one item.

7. The method according to claim 1, further comprising:

executing the program using the items of the specified one or more table as inputs to generate an output table including each of the input items inputted at the execution of the program.

8. A device comprising:

a memory; and a processor coupled to the memory and configured to:

specify one or more tables which includes one or more items designated by a user, based on first correspondence information associating items with each table, specify for a first combination of the specified one or more tables, a program which satisfies a condition indicating that each item inputted at an execution of the program corresponds to one of the items in the table of the first combination and each item output by the execution corresponds to the one or more output items, from among second correspondence information including an input item that is input to the program and an output item that is output by the execution of the program, determining, for a second combination consisting of the program and the first combination, whether the one or more output items satisfy a condition indicating that the one or more output items corresponds to items output by the execution, and output from the second combination, output information that satisfies the condition indicating that the one or more output items corresponds to items output by the execution of the program, wherein the output information includes the one or more tables and the program.

9. The device according to claim 8, wherein the program satisfies a first condition or a second condition, the first condition indicates that each item inputted at the execution of the program matches the output item, and the second condition indicates that item inputted at the execution of the program matches one of the items in the specified one or more tables.

10. The device according to claim 8, wherein the program satisfies a third condition that a first number of the specified one or more tables and a second number of tables that are used for inputting the program match one another.

11. The device according to claim 8, wherein the program satisfies a fourth condition that the input item matches one of the items in the specified one or more tables and the output item matches at least one item inputted at the execution of the program.

12. The device according to claim 11, wherein the processor is configured to:

specify the program that causes each item inputted at the execution of the program to be output based on the second correspondence information, and generate one or more input items based on each item inputted at the execution of the program, and information for input and output of the specified program.

13. The device according to claim 10, wherein the fourth condition is a condition that the input item matches one of the items in the specified one or more tables or one of the input items inputted at the execution of the program and the output item matches one of the designated at least one item.

14. The device according to claim 8, wherein the processor is configured to execute the program using the items of the specified one or more table as inputs to generate an output table including each of the input items inputted at the execution of the program.

\* \* \* \* \*